(12) United States Patent
Matsuoka

(10) Patent No.: US 8,150,482 B2
(45) Date of Patent: Apr. 3, 2012

(54) MOBILE COMPUTING DEVICE WITH MOVEABLE HOUSING SEGMENTS

(75) Inventor: Yoshimichi Matsuoka, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1088 days.

(21) Appl. No.: 11/971,136

(22) Filed: Jan. 8, 2008

(65) Prior Publication Data

US 2009/0176542 A1 Jul. 9, 2009

(51) Int. Cl.
*H04M 1/00* (2006.01)

(52) U.S. Cl. .................. 455/575.4; 455/556.2; 455/90.3; 379/433.01

(58) Field of Classification Search ............... 455/575.4, 455/575.1, 550.1, 556.2, 90.3, 418; 379/433.01
See application file for complete search history.

(56) References Cited

U.S. PATENT DOCUMENTS

| | | | |
|---|---|---|---|
| 4,279,021 A | 7/1981 | See et al. | |
| 4,415,065 A | 11/1983 | Sandstedt | |
| 4,587,630 A | 5/1986 | Straton et al. | |
| 4,725,694 A | 2/1988 | Auer et al. | |
| 4,764,770 A | 8/1988 | Church | |
| 4,803,474 A | 2/1989 | Kulp | |
| 4,887,212 A | 12/1989 | Zamora et al. | |
| 4,892,981 A | 1/1990 | Soloway et al. | |
| 4,896,003 A | 1/1990 | Hsieh | |
| 4,916,441 A | 4/1990 | Gombrich | |
| 4,931,781 A | 6/1990 | Miyakawa | |
| 5,010,547 A | 4/1991 | Johnson et al. | |
| 5,012,219 A | 4/1991 | Henry | |
| D320,598 S | 10/1991 | Auerbach et al. | |
| 5,067,164 A | 11/1991 | Denker et al. | |
| 5,075,684 A | 12/1991 | DeLuca | |
| 5,101,439 A | 3/1992 | Kiang | |
| 5,109,539 A | 4/1992 | Inubushi et al. | |
| D326,451 S | 5/1992 | Roegner | |
| 5,218,188 A | 6/1993 | Hanson | |
| 5,227,614 A | 7/1993 | Danielson et al. | |
| 5,235,561 A | 8/1993 | Seager | |
| 5,307,086 A | 4/1994 | Griffin et al. | |
| 5,334,824 A | 8/1994 | Martinez | |
| 5,335,276 A | 8/1994 | Thompson et al. | |
| 5,336,001 A | 8/1994 | Lichtenberg | |
| 5,345,615 A | 9/1994 | Garofalo | |

(Continued)

FOREIGN PATENT DOCUMENTS

EP 0149762 7/1986

(Continued)

OTHER PUBLICATIONS

U.S. Appl. No. 60/329,180, filed Oct. 15, 2001, Capps.

(Continued)

*Primary Examiner* — Shaima Q Aminzay

(57) ABSTRACT

A mobile computing device includes a first housing segment and a second housing segment. The first housing segment includes a display surface on a front exterior face. The second housing segment that is slideably coupled to the first housing segment to move between an extended position and a contracted position. The second housing segment includes a keypad provided on a surface that is exposed for use when the device is in the extended position. The first housing segment and the second housing segment are coupled so that a path of motion followed by one of the first housing segment or second housing segment when moving between the extended position and the contracted position is continuously arced.

23 Claims, 9 Drawing Sheets

U.S. PATENT DOCUMENTS

| | | |
|---|---|---|
| 5,357,065 A | 10/1994 | Mitamura et al. |
| 5,359,317 A | 10/1994 | Gomez et al. |
| 5,379,057 A | 1/1995 | Clough et al. |
| 5,381,387 A | 1/1995 | Blonder et al. |
| 5,392,447 A | 2/1995 | Schlack et al. |
| 5,394,140 A | 2/1995 | Wong et al. |
| 5,398,310 A | 3/1995 | Tchao et al. |
| D359,920 S | 7/1995 | Sakamoto |
| 5,440,629 A | 8/1995 | Gray |
| 5,442,406 A | 8/1995 | Altmanshofer et al. |
| 5,450,619 A | 9/1995 | Maeda |
| 5,465,401 A | 11/1995 | Thompson |
| 5,494,363 A | 2/1996 | Hochgesang |
| 5,502,460 A | 3/1996 | Bowen |
| 5,503,484 A | 4/1996 | Louis |
| 5,510,808 A | 4/1996 | Cina |
| 5,563,629 A | 10/1996 | Caprara |
| 5,584,054 A | 12/1996 | Tyneski et al. |
| 5,612,682 A | 3/1997 | DeLuca et al. |
| 5,619,555 A | 4/1997 | Fenton et al. |
| 5,627,978 A | 5/1997 | Altom et al. |
| 5,644,338 A | 7/1997 | Bowen |
| 5,646,402 A | 7/1997 | Khovaylo et al. |
| 5,650,776 A | 7/1997 | Mitchell et al. |
| 5,661,641 A | 8/1997 | Shindo |
| 5,705,995 A | 1/1998 | Laflin et al. |
| 5,719,936 A | 2/1998 | Hillenmayer |
| 5,742,894 A | 4/1998 | Jambhekar et al. |
| 5,745,904 A | 4/1998 | King et al. |
| 5,754,636 A | 5/1998 | Bayless et al. |
| 5,779,059 A | 7/1998 | Ikegami et al. |
| 5,797,029 A | 8/1998 | Hsu et al. |
| 5,797,089 A | 8/1998 | Nguyen |
| 5,797,098 A | 8/1998 | Schroeder et al. |
| 5,809,115 A | 9/1998 | Inkinen |
| 5,812,651 A | 9/1998 | Kaplan |
| 5,813,778 A | 9/1998 | Shi |
| 5,815,142 A | 9/1998 | Ailard et al. |
| 5,821,881 A | 10/1998 | Fischer et al. |
| D401,577 S | 11/1998 | Yamaguchi |
| 5,848,356 A | 12/1998 | Jambhekar et al. |
| 5,860,074 A | 1/1999 | Rowe et al. |
| 5,873,108 A | 2/1999 | Goyal et al. |
| 5,898,600 A | 4/1999 | Isashi |
| 5,903,852 A | 5/1999 | Schaupp et al. |
| 5,917,905 A | 6/1999 | Whipple et al. |
| 5,917,906 A | 6/1999 | Thornton |
| 5,922,071 A | 7/1999 | Taylor et al. |
| 5,941,648 A | 8/1999 | Robinson et al. |
| 5,949,764 A | 9/1999 | Yoshida et al. |
| 5,958,006 A | 9/1999 | Eggleston et al. |
| 5,974,334 A | 10/1999 | Jones |
| D416,256 S | 11/1999 | Griffin et al. |
| 6,002,944 A | 12/1999 | Beyda |
| 6,006,109 A | 12/1999 | Shin |
| 6,009,338 A | 12/1999 | Iwata et al. |
| 6,016,142 A | 1/2000 | Chang et al. |
| 6,018,571 A | 1/2000 | Langlois et al. |
| 6,029,072 A | 2/2000 | Barber |
| 6,035,214 A | 3/2000 | Henderson |
| 6,055,439 A | 4/2000 | Helin et al. |
| 6,058,304 A | 5/2000 | Callaghan et al. |
| 6,064,734 A | 5/2000 | Hasegawa et al. |
| 6,069,648 A | 5/2000 | Suso et al. |
| 6,073,027 A | 6/2000 | Norman et al. |
| 6,084,951 A | 7/2000 | Smith et al. |
| 6,097,391 A | 8/2000 | Wilcox |
| 6,101,531 A | 8/2000 | Egglestorl et al. |
| 6,111,527 A | 8/2000 | Susel |
| 6,115,248 A | 9/2000 | Canova et al. |
| 6,119,179 A | 9/2000 | Whitridge |
| 6,128,475 A | 10/2000 | Wicks et al. |
| 6,133,916 A | 10/2000 | Bukszar et al. |
| 6,137,469 A | 10/2000 | Wu et al. |
| 6,157,630 A | 12/2000 | Adler et al. |
| 6,166,342 A | 12/2000 | Chou |
| 6,169,911 B1 | 1/2001 | Wagner et al. |
| 6,188,917 B1 | 2/2001 | Laureanti |
| 6,192,118 B1 | 2/2001 | Bayless et al. |
| 6,198,053 B1 | 3/2001 | Chou |
| 6,208,879 B1 | 3/2001 | Iwata et al. |
| 6,215,865 B1 | 4/2001 | McCalmont |
| 6,233,469 B1 | 5/2001 | Watanabe |
| 6,243,452 B1 | 6/2001 | O'Shaughnessey et al. |
| 6,243,595 B1 | 6/2001 | Lee et al. |
| 6,256,631 B1 | 7/2001 | Malcolm |
| 6,259,449 B1 | 7/2001 | Saxena et al. |
| 6,259,932 B1 | 7/2001 | Constien |
| 6,262,716 B1 | 7/2001 | Raasch |
| 6,278,884 B1 | 8/2001 | Kim |
| 6,295,372 B1 | 9/2001 | Hawkins et al. |
| 6,297,795 B1 | 10/2001 | Kato et al. |
| 6,297,945 B1 | 10/2001 | Yamamoto |
| 6,310,609 B1 | 10/2001 | Morgenthaler |
| 6,317,313 B1 | 11/2001 | Mosgrove et al. |
| 6,317,781 B1 | 11/2001 | DeBoor et al. |
| 6,333,973 B1 | 12/2001 | Smith et al. |
| D454,349 S | 3/2002 | Makidera et al. |
| 6,370,018 B1 | 4/2002 | Miller et al. |
| D456,794 S | 5/2002 | Laverick et al. |
| 6,389,124 B1 | 5/2002 | Schnarel et al. |
| 6,397,084 B1 | 5/2002 | Wicks et al. |
| 6,405,172 B1 | 6/2002 | Baker et al. |
| 6,415,138 B2 | 7/2002 | Sirola et al. |
| 6,424,369 B1 | 7/2002 | Adair et al. |
| 6,442,263 B1 | 8/2002 | Beaton et al. |
| D462,354 S | 9/2002 | Kimbre et al. |
| 6,445,577 B1 | 9/2002 | Madsen et al. |
| 6,452,588 B2 | 9/2002 | Griffin et al. |
| D464,962 S | 10/2002 | MacGregor et al. |
| 6,462,941 B1 | 10/2002 | Hulick et al. |
| 6,466,202 B1 | 10/2002 | Suso et al. |
| 6,469,910 B2 | 10/2002 | Lefort |
| 6,483,445 B1 | 11/2002 | England |
| 6,483,697 B1 | 11/2002 | Jenks et al. |
| 6,502,090 B1 | 12/2002 | Raisanen |
| D468,714 S | 1/2003 | Maruska et al. |
| 6,512,507 B1 | 1/2003 | Furihata et al. |
| D470,842 S | 2/2003 | Bhatia et al. |
| 6,516,202 B1 | 2/2003 | Hawkins et al. |
| 6,525,715 B2 | 2/2003 | Uchiyama |
| D471,559 S | 3/2003 | DeSaulles |
| 6,535,749 B1 | 3/2003 | Iwata et al. |
| D473,580 S | 4/2003 | Nakahara |
| 6,542,721 B2 | 4/2003 | Boesen |
| 6,549,194 B1 | 4/2003 | McIntyre et al. |
| 6,557,004 B1 | 4/2003 | Ben-Shachar et al. |
| 6,577,721 B1 | 6/2003 | Vainio |
| 6,577,877 B1 | 6/2003 | Charlier et al. |
| 6,583,806 B2 | 6/2003 | Ludwig et al. |
| D477,114 S | 7/2003 | Sheng |
| D477,597 S | 7/2003 | Laverick et al. |
| 6,587,700 B1 | 7/2003 | Meins et al. |
| 6,636,203 B1 | 10/2003 | Wong et al. |
| 6,636,419 B2 | 10/2003 | Duarte |
| 6,640,114 B2 | 10/2003 | Bae |
| 6,643,124 B1 | 11/2003 | Wilk |
| 6,643,529 B1 | 11/2003 | Inoue et al. |
| 6,658,272 B1 | 12/2003 | Lenchik |
| 6,661,404 B1 | 12/2003 | Sirola et al. |
| 6,665,173 B2 | 12/2003 | Brandenberg et al. |
| D488,478 S | 4/2004 | Laverick et al. |
| D490,100 S | 5/2004 | Su et al. |
| 6,748,249 B1 | 6/2004 | Eromaki et al. |
| 6,751,473 B1 | 6/2004 | Goyal et al. |
| D494,166 S | 8/2004 | Kumagai et al. |
| 6,771,992 B1 | 8/2004 | Tomura et al. |
| 6,781,575 B1 | 8/2004 | Hawkins et al. |
| 6,792,090 B1 | 9/2004 | Kobayashi |
| 6,882,326 B2 | 4/2005 | Hirayama et al. |
| 6,898,301 B2 | 5/2005 | Iwanaga |
| 6,947,158 B1 | 9/2005 | Kitamura et al. |
| D511,342 S | 11/2005 | Chien |
| 6,961,593 B1 | 11/2005 | Lonka et al. |
| 6,973,217 B2 | 12/2005 | Bolick et al. |
| 6,976,217 B1 | 12/2005 | Vertaschitsch |
| 7,007,239 B1 | 2/2006 | Hawkins et al. |

| | | |
|---|---|---|
| 7,016,182 B2 | 3/2006 | Brandenberg et al. |
| 7,058,168 B1 | 6/2006 | Knappe et al. |
| 7,069,056 B2 | 6/2006 | Iwata et al. |
| 7,069,063 B2 | 6/2006 | Halkosaari et al. |
| 7,092,747 B2 | 8/2006 | Park et al. |
| 7,155,419 B2 | 12/2006 | Blackman et al. |
| D535,281 S | 1/2007 | Yang |
| 7,181,256 B2 | 2/2007 | Hyun et al. |
| 7,187,363 B2 | 3/2007 | Nguyen et al. |
| 7,231,208 B2 | 6/2007 | Robertson et al. |
| D546,313 S | 7/2007 | Lheem |
| 7,269,450 B2 | 9/2007 | Lee et al. |
| D558,757 S | 1/2008 | Andre et al. |
| D561,159 S | 2/2008 | Heng et al. |
| D561,782 S | 2/2008 | Kim |
| D562,289 S | 2/2008 | Suk et al. |
| D563,935 S | 3/2008 | Kim et al. |
| D568,284 S | 5/2008 | Lee et al. |
| D575,259 S | 8/2008 | Kim et al. |
| 7,412,258 B1 | 8/2008 | Lipponen et al. |
| D581,390 S | 11/2008 | Ma et al. |
| D585,044 S | 1/2009 | Seo et al. |
| 7,474,298 B2 | 1/2009 | Nguyen et al. |
| D588,594 S | 3/2009 | Matsuoka |
| D590,804 S | 4/2009 | Tkachuk |
| D591,739 S | 5/2009 | Matsuoka |
| D592,628 S | 5/2009 | Kim et al. |
| D593,062 S | 5/2009 | Lee et al. |
| D594,433 S | 6/2009 | Seo et al. |
| D596,152 S | 7/2009 | Hong et al. |
| D597,507 S | 8/2009 | Jung et al. |
| D600,230 S | 9/2009 | Salmi et al. |
| D600,241 S | 9/2009 | Andre et al. |
| D600,667 S | 9/2009 | Hu et al. |
| D601,993 S | 10/2009 | Yun et al. |
| D602,014 S | 10/2009 | Andre et al. |
| D602,017 S | 10/2009 | Andre et al. |
| D602,455 S | 10/2009 | Lee et al. |
| D602,903 S | 10/2009 | Tompkin et al. |
| D603,830 S | 11/2009 | Webb et al. |
| D606,037 S | 12/2009 | Christopher et al. |
| D606,960 S | 12/2009 | Ahn et al. |
| 7,636,592 B2 | 12/2009 | Kim et al. |
| D608,228 S | 1/2010 | Miyawaki |
| 2001/0011993 A1 | 8/2001 | Saarinen |
| 2001/0034222 A1 | 10/2001 | Roustaei et al. |
| 2001/0046886 A1 | 11/2001 | Ishigaki |
| 2002/0042853 A1 | 4/2002 | Santoh et al. |
| 2002/0044136 A1 | 4/2002 | Griffin et al. |
| 2002/0044216 A1 | 4/2002 | Cha |
| 2002/0082043 A1 | 6/2002 | Wilska et al. |
| 2002/0115478 A1 | 8/2002 | Fujisawa et al. |
| 2002/0133378 A1 | 9/2002 | Mault et al. |
| 2002/0140667 A1 | 10/2002 | Horiki |
| 2002/0154745 A1 | 10/2002 | Shtivelman |
| 2002/0169924 A1 | 11/2002 | Osborn |
| 2002/0191160 A1 | 12/2002 | Chuang |
| 2003/0008679 A1 | 1/2003 | Iwata et al. |
| 2003/0034987 A1 | 2/2003 | Webb et al. |
| 2003/0064751 A1 | 4/2003 | Charlier et al. |
| 2003/0071791 A1 | 4/2003 | Hanson |
| 2003/0073414 A1 | 4/2003 | Capps |
| 2003/0090468 A1 | 5/2003 | Finke-Anlauff |
| 2003/0112225 A1 | 6/2003 | Granberg |
| 2003/0122779 A1 | 7/2003 | Martin et al. |
| 2003/0122882 A1 | 7/2003 | Kho |
| 2003/0128190 A1 | 7/2003 | Wilbrink et al. |
| 2003/0137493 A1 | 7/2003 | Chuang |
| 2003/0228863 A1 | 12/2003 | Vander Veen et al. |
| 2003/0228888 A1 | 12/2003 | Adamson |
| 2004/0008827 A1 | 1/2004 | Martin et al. |
| 2004/0023643 A1 | 2/2004 | Vander Veen et al. |
| 2004/0026136 A1 | 2/2004 | Hill et al. |
| 2004/0028192 A1 | 2/2004 | Pelletier |
| 2004/0028199 A1 | 2/2004 | Carlson |
| 2004/0039794 A1 | 2/2004 | Biby et al. |
| 2004/0062367 A1 | 4/2004 | Fellenstein et al. |
| 2004/0155909 A1 | 8/2004 | Wagner |
| 2004/0157653 A1 | 8/2004 | Kato |
| 2004/0203977 A1 | 10/2004 | Kennedy | |
| 2004/0240163 A1 | 12/2004 | Adams et al. | |
| 2005/0267975 A1 | 12/2005 | Qureshi et al. | |
| 2006/0015819 A1 | 1/2006 | Hawkins et al. | |
| 2006/0033706 A1 | 2/2006 | Haitani et al. | |
| 2006/0121938 A1 | 6/2006 | Hawkins et al. | |
| 2006/0160566 A1 | 7/2006 | Plahte et al. | |
| 2006/0161858 A1 | 7/2006 | Hawkins et al. | |
| 2006/0168539 A1 | 7/2006 | Hawkins et al. | |
| 2006/0281501 A1 | 12/2006 | Zuo et al. | |
| 2007/0146330 A1 | 6/2007 | Nguyen | |
| 2007/0155427 A1 | 7/2007 | Tran | |
| 2007/0254730 A1* | 11/2007 | Kim et al. | 455/575.4 |
| 2007/0275774 A1* | 11/2007 | Fagrenius et al. | 455/575.4 |
| 2007/0291052 A1 | 12/2007 | van der Meulen | |
| 2008/0024453 A1 | 1/2008 | Webb et al. | |
| 2008/0039151 A1* | 2/2008 | Kim et al. | 455/566 |
| 2009/0034172 A1 | 2/2009 | Nguyen et al. | |
| 2009/0147471 A1 | 6/2009 | Francisco et al. | |
| 2009/0174666 A1* | 7/2009 | Matsuoka | 345/169 |
| 2009/0176542 A1 | 7/2009 | Matsuoka | |
| 2009/0186662 A1 | 7/2009 | Rak et al. | |
| 2009/0305742 A1 | 12/2009 | Caballero et al. | |

FOREIGN PATENT DOCUMENTS

| | | |
|---|---|---|
| EP | 0704788 | 4/1996 |
| EP | 1051012 | 11/2000 |
| EP | 1107101 | 6/2001 |
| EP | 1220517 | 7/2002 |
| FR | 2760933 | 9/1998 |
| GB | 2289595 | 11/1995 |
| JP | 2001024762 | 1/2001 |
| KR | 10-2002-14107 A | 2/2002 |
| KR | 10-2003-90549 A | 11/2003 |
| KR | 1020030090549 | * 11/2003 |
| KR | 20-0355890 Y1 | 7/2004 |
| KR | 20-0384472 Y1 | 5/2005 |
| KR | 20-0389749 Y1 | 7/2005 |
| WO | WO99/08238 | 2/1999 |
| WO | WO01/13605 | 2/2001 |

OTHER PUBLICATIONS

Final Office Action mailed Jun. 4, 2010 in U.S. Appl. No. 11/611,830.

"3GPP2 Multimedia Messaging System—MMS Specification Overview—Revision: A. Mobile Messaging", May 2003, [online] [Retrieved on Dec. 10, 2004] Retrieved from the Internet: URL: http://www.lebodic.net/left.htm.

"An Introduction to Mobile Messaging," Mobile Messaging, May 2003, [online] [Retrieved on Dec. 10, 2004] Retrieved from the Internet: URL: http://www.lebodic.netlintro.htm.

"At Last, Technology Harnesse [sic] One of the Most Powerf [sic] Forces know to Men.", Go Corporation, 14 pages, Foster City, (1991).

"AT&T New Release, NCR Cuts Price of 3170 Notebook Computer 11 to 19 Percent", 2 pages [online], retrieved from the Internet: URL: http://www.att.com/press/0393/930308.nca.html., (Mar. 8, 1993).

"Definition of Handheld Computer", printed from thte website: http://dictionary.reference.com, dated Feb. 11, 2004 (3 pgs).

"Definition of Handheld", printed from thte website: http://searchmobilecomputing.techtarget.com, dated Feb. 11, 2004 (3 pgs).

"Excerpts from Ericsson Mobile Phone 1888 World User's Guide", Copyright 1998 Ericsson Mobile Communications AB.

"Handheld" Game Console—Wikipedia, the free encyclopedia, [online] [Retrieved on Oct. 13, 2006], Retrieved from the Internet: URL: http://en.wikipedia.org/wjkwHandheld_game_console.

"IBM Selects Racotek Data/Voice Communications Services to Interface with Touchmobile Product", PR Newswire, Jan. 26, 1993, 2 pages.

"IBM Touchmobile Information and Planning Guide", International Business Machines Incorporated, Mar. 1993, 20 pages.

"IBM TouchMobile Solution for Data Capture and Communication, Keeping Your Business Moving in the 90's, International Business Machines Incorporated, Jan. 1993, 13 pages."

"IBM's Touchmobile Helps Field Workers Collect Data at the Touch of a Finger", PR Newswire, Jan. 26, 1993, 1 page.

"Nokia, Frequently Asked Questions", http://www.nokia.com.in/nokiaapac/india/faqs_list/0,18778,39_41,00.html. Nov. 17, 2003.

"PCT Notification of Transmittal of International Preliminary Examination Report", PCT/US2000/22182, (Oct. 26, 2001), 6 pages.

"Printout of various website pages from biz.yahoo.com article "Conference Calling Added to BestNet's Service Designed for Palm OS(R) Handhelds"—Tuesday, Aug. 21, 2001".

"The Handheld Computing Industry—2000", Stanford Technology Ventures Program (STVP), (Jan. 13, 2001), pp. 1-38.

Agrawal, P. et al., "Get Wireless: A Mobile Technology Spectrum", IT PRO, IEEE, (Jul./Aug. 1999), 18-23.

American Programmer, American Programmer, Inc., NY, (Dec. 1991), 4-33.

Caar, R.M. "The Point of the Pen". Byte, Reprinted, Feb. 1991, 10 pages.

Chan, E. et al., "Personal Digital Assistants & Wireless Convergence", MGMT 557 Strategic Management of Innovation, (May 4, 2000), 1-28.

Communication pursuant to Article 96(2) EPC, European Patent Office, Application No. 02 766 017.4-1527, Aug. 2, 2007, 8 pages.

Communications Solutions ™TMC Labs Test Drive, Mar. 2000, Retrieved from the Internet: URL: https://www.tmcnet.com/articles/comsol/0300/0300labs1.htm.

Cowart, T.,Mastering Windows 95—The Windows 95 Bible, (1995), 110-117, 352-359, SyBex, USA.

Cullen, A. "Connecting with Your EO Cellular Module", EO, Inc. Mountain View., (1992, 1993), ii-33.

Cullen, A. "Getting Started with Your EO Personal Communicator", EO, Inc. Mountain View., (1992, 1993), ii-74.

Cullen, A. "Lookup Guide to the EO Personal Communicator", EO, Inc. Mountain View., (1992, 1993), ii-320.

Dyszel, B., "Handspring Visor for Dummies", IDG Books Worldwide, Inc, (2000), o. 13, 15, 121, 122, 123, 208.

Excerpts from Handspring VisorPhone™ User's Guide, Copyright 2000 Handspring, Inc.

Excerpts from Motorola Timeport Tri-Band Mobile Telephone Manual, Copyright 1999 Motorola, Inc.

Final Office Action mailed Mar. 13, 2006, for US 2003/0034987, 10 pages.

GO Corporation Information Statement, 218 pages, (Nov. 8, 1993).

Hewlet Packard, Products and Services, http://www.hp.com/, Nov. 11, 2001.

Ikeya, B. "Detailed Overview of the PC Card Standard, PCMCIA", http://www.pcmcia.org/pccarcJstandard.htm., (1998).

International Search Report and Written Opinion of the International Searching Authority in International Application PCT/US2002/26197, ISA/US, Dec. 13, 2002, 4pgs.

Introduction to PCMCIA Technical Tutorial, Dec. 6, 2002. pp. 1-11.

Kanellos, M. "Qualcomm Merges Phone, Handheld", CNET News.com, Sep. 21, 1998 http://www.news.com/Qualcomm+merges+phone%2C+handheld/2100-1001_3-215791.html.

MacNeill, D. "Messaging Card and NewtonMail: We Pick Up and Deliver", On The Go Magazine, http://www.pencomputing.com/Newton/NewtonNotes2.html, 2 pages.

MacNeill, D. "Wireless Newton Technology Goes to Work", On The Go Magazine, Oct. 13, 1993, http://www.pencomputing.com/Newton/NewtonNotes2.html, 2 pages.

Maki, K. "The AT&T EO Travel Guide", John Wiley & Sons, Inc., N.Y. 1993, iii-555.

Microsoft Microsoft Windows & MS_DOS User's Guide, (1993), p. 19, 26.

Microsoft® Windows Version 5.1, copyright 2001 (hereinafter "Windows") (screenshots 1-8).

Nokia Introduces Mobile Chat With Nokia 3310, http://www.mobiletechnews.com/info/2000/09/01/1_42022.htm, (Sep. 1, 2000).

Non-Final Office Action dated Apr. 27, 2009 In U.S. Appl. No. 09/932,213, 18 pgs.

Notification of Transmittal of International Search Report and Written Opinion, International Search Report, and Written Opinion mailed Jul. 27, 2009 in International Application No. PCT/US2008/086487, 14 pages.

PCT International Search Report, PCT/US2000/22182, (Jan. 10, 2001), 8 pages.

PCT International Search Report, Publication WO 01/13605 A3, (Feb. 22, 2001).

pdQ™ Basics Handbook, Qualcomm Incorporated., (1998, 1999), 96 pages.

Plumley, B., "Ten Minute Guide to Windows NT Workstation 4.O", Que, (Aug. 1996).

Powell, E. "Kyocera pdQ Smartphone—Brief Article—Product Announcement", http://www.findarticles.com/plartjdes/mjmOFAUTis917/ai65650619/print., (2000).

Printout of various website pages from www.bestnetcall.com regarding pdaCall (patent pending), printed Aug. 21, 2001.

Qualcomm pdQ™ 1900 Digital PCTS SmartPhone, Qualcomm Incorporated, (1999), 2 pages.

Schlender, B. R., "Hot New PCs That Read Your Writing", Fortune, Reprinted, (Feb. 11, 1991), 6 pages.

Shah, R. "The Qualcomm pdQ: Kill Two Birds with One Phone", CNN.com, http://archives.cnn.com/i999rrECHJptechJi2/o3/qualcomm.pdq, (Dec. 3, 1999).

Stock, R. "The World of Messaging An Introduction to Personal Communications", EO, Inc., Mountain View, (1992, 1993), p. ii-69.

Supplemental European Search Report dated Apr. 24, 2007 in PCT/US02/26197, European Patent Office, 3 pages.

T-Mobile Products; Handhelds, http://www.tmobile.com, (Sep. 28, 2002), 2 pages.

T-Mobile Products; Sidekick, http://www.tmobile.com, (Sep. 28, 2002), 3 pages.

Toshiba Computer Systems Group, http://www.toshiba.com (May 28, 2002), 1 page.

Toshiba Computer Systems Group: Pocket PC e570 http://www.pda.toshiba.com (Jul. 7, 2001), 2 page.

* cited by examiner

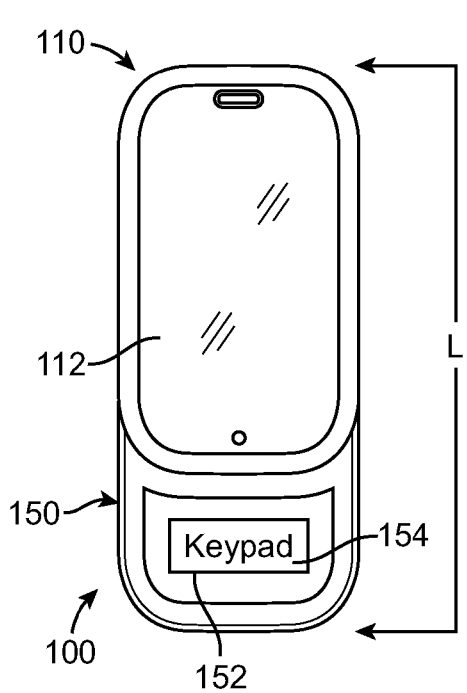
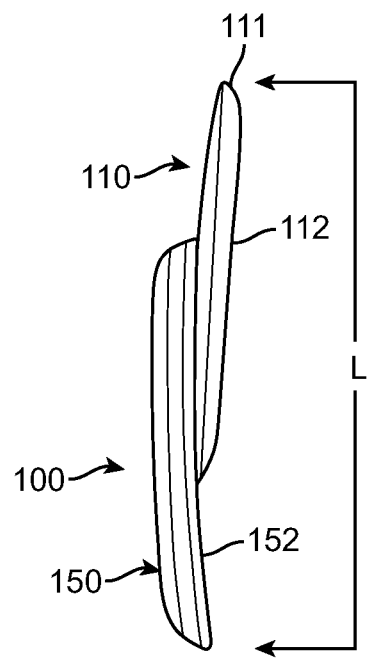
FIG. 1A   FIG. 1B
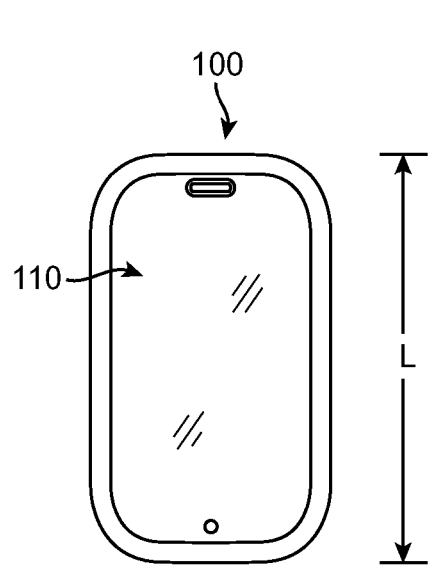
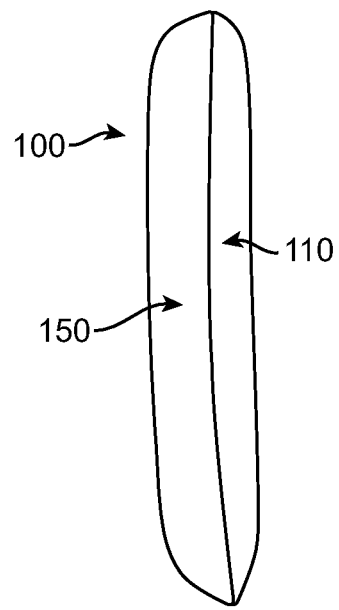
FIG. 1C   FIG. 1D

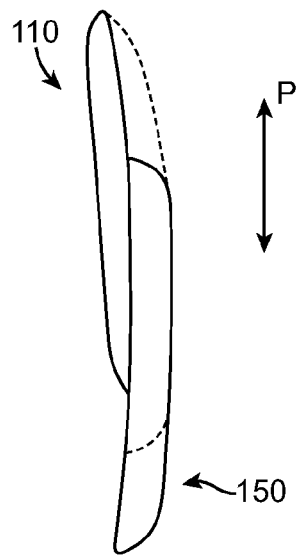
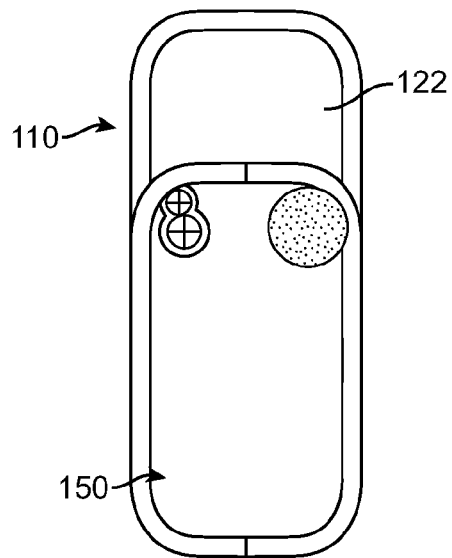
FIG. 1E          FIG. 1F
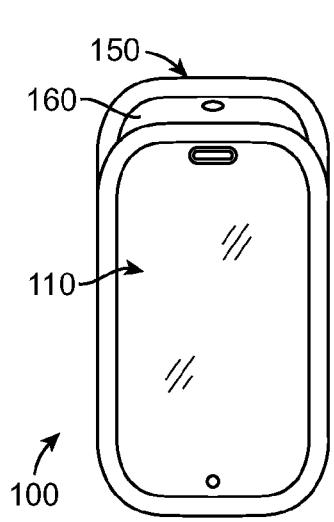
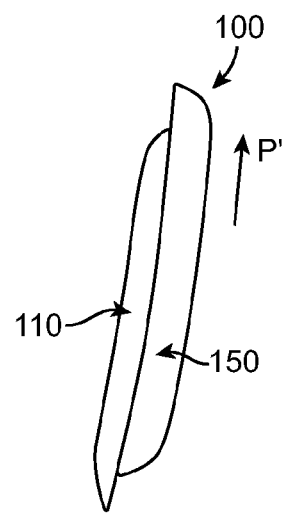
FIG. 2A          FIG. 2B

MOBILE COMPUTING DEVICE WITH MOVEABLE HOUSING SEGMENTS

TECHNICAL FIELD

The disclosed embodiments relate generally to the field of housings for mobile computing devices. In particular, embodiments described herein pertain to a mobile computing device that has a housing construction with moveable housing segments.

BACKGROUND

Over the last several years, the growth of cell phones and messaging devices has increased the need for keypads and button/key sets that are small and tightly spaced. In particular, small form-factor keyboards, including QWERTY layouts, have become smaller and more tightly spaced. With decreasing overall size, there has been greater focus on efforts to provide functionality and input mechanisms more effectively on the housings.

In addition to a keyboard, mobile computing devices and other electronic devices typically incorporate numerous buttons to perform specific functions. These buttons may be dedicated to launching applications, short cuts, or special tasks such as answering or dropping phone calls. The configuration, orientation and positioning of such buttons is often a matter of concern, particularly when devices are smaller.

At the same time, there has been added focus to how displays are presented, particularly with the increase resolution and power made available under improved technology. Moreover, form factor consideration such as slimness and appearance are important in marketing a device.

Production of mobile computing devices is made more difficult in the fact that conventional devices use many parts or components. The housing for a typical conventional mobile computing device typically includes a top shell, a back shell, and a midframe. The components that comprise the contents of the housing, such as printed circuit boards and display assemblies, normally require additional assembly steps. Many devices include additional housing features that are provided on the device separately. The result is that the devices often have numerous interconnected components. In the case of the housing, the numerous components yield devices that are less durable and more difficult to assemble.

In order to increase the features and functionality on a computing device, many mobile computing devices employ a sliding construction between two segments of the housing. Typically, in a sliding construction, the housing a computing device is separated into two distinct parts that are coupled to one another to slide. The parts of the housing can be extended or contracted, to reveal functionality and/or adjust the overall size of the computing device.

BRIEF DESCRIPTION OF THE DRAWINGS

FIG. 1A thru FIG. 1F illustrate a mobile computing that is structured to include moveable housing segments that are positionable between an extended and contracted position, in accordance with an embodiment of the invention.

FIG. 2A and FIG. 2B illustrate a mobile computing device that includes moveable housing segments are positionable between a first extended position, a contracted position, and a second extended position, according to an embodiment of the invention.

DETAILED DESCRIPTION

Figure 3A:
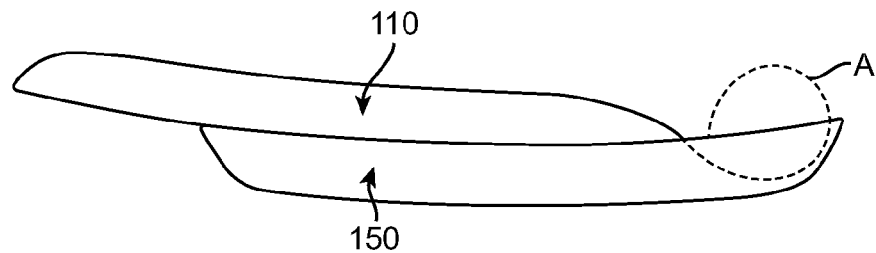
FIG. 3A thru FIG. 3C illustrate a back housing segment of a computing device such as described with FIG. 1A-FIG. 1F, according to an embodiment of the invention.

Embodiments described herein provide for a mobile computing device that is constructed of moveable housing segments. In an embodiment, at least one of the housing segments is display dominant. Still further, another embodiment provides that housing segments of the mobile computing devices are moveable along a path of motion that is continuously arced.

Still further, one or more described herein provide for a computing device that emphasizes and isolates the keypad and the display surface. In cellular telephony/messaging, for example, the display surface and keypad are the primary focus of user attention when interacting with the device. As will be described, embodiments described herein heighten the user's experience with the primary interfaces. In particular, an embodiment provides for an entire housing segment that is display-dominant. Additionally, an embodiment provides for a separate housing segment that provides a keypad, apart from the display dominant housing segment.

An embodiment includes a mobile computing device having a first housing segment and a second housing segment. The first housing segment includes a display surface on a front exterior face. The second housing segment that is slideably coupled to the first housing segment to move between an extended position and a contracted position. The second housing segment includes a keypad provided on a surface that is exposed for use when the device is in the extended position. The first housing segment and the second housing segment are coupled so that a path of motion followed by one of the first housing segment or second housing segment when moving between the extended position and the contracted position is continuously arced.

In another embodiment, a mobile computing device includes a first housing segment and a second housing segment. The first housing segment includes a display surface on a front exterior face. The second housing segment is slideably coupled to the first housing segment to move between an extended position and a contracted position. The second housing segment includes a keypad provided on a surface that is exposed for use when the device is in the extended position. In an embodiment, substantially all of the front exterior face is smooth and seamless.

With regard to some quantitative expressions used herein, the expression "substantially all" means 90% or more. Furthermore, the term "majority" means at least 50% more than 50% of a stated quantity or comparison.

Slider with Arch Movement

FIG. 1A thru FIG. 1F illustrate a mobile computing device having a housing construction that includes moveable or slideable segments, under an embodiment of the invention. According to an embodiment, the mobile computing device 100 is equipped with cellular telephony and data resources, so as to enable cellular telephony and messaging. The device 100 may correspond to a cellular telephony/data devices, capable of enabling voice/telephony communications, messaging services (e.g. email, Short Message Service (SMS), Multimedia Message Service (MMS), Instant Messaging) and/or other functionality such as media playback, Global Positioning System (GPS) functionality, wireless fidelity (WiFi) or Internet access, and image/video capture. As such, the device 100 may be relatively small, such as in the form of a handheld device.

FIG. 1A is a frontal view of the mobile computing device 100 in an extended position, under an embodiment. The mobile computing device 100 includes a front housing segment 110 and a back housing segment 150. The front and back housing segments 110, 150 may be slideably or moveably coupled so that the two segments may be moved between an extended position (FIG. 1A and FIG. 1B) into a contracted position (FIG. 1C and FIG. 1D). In the extended position, a length L of the overall device is maximized.

Each housing segment 110, 150 may carry functionality and/or devices. In one implementation, the front housing segment 110 may provide a display surface 412 (see FIGS. 4A and 4B) that is touch-sensitive and/or includes various user-interface features. These may include buttons, multiway mechanical features, 'soft' features (such as touch-sensitive surfaces with or without computer-generated graphics) or switches. The back housing segment 150 may carry a keypad or keyboard 154 or other functionality that is exposed when the computing device 100 is in the extended position (see FIG. 3C).

The front housing segment 110 includes a front exterior face 112, which corresponds to a contoured or planar surface that is viewable from a frontal perspective. In an embodiment, the exterior front face 112 is substantially smooth and seamless, while being equipped with different interface features, such as display areas, touch-sensitive buttons, and button-like actuation mechanisms. As will be described, most, if not all, of the user-interface features are provided as a unitary or integral part of the smooth exterior surface that comprises the front exterior face 112. As described with one or more embodiments below, for example, the front exterior face 112 may include a display surface and input features in the form of sensor regions and/or contact or touch-sensitive display regions. These regions may include computer-generated content or be provided as static button-like input features.

The back housing segment 150 includes a front exposable surface 152 on which a keyboard 154 or other mechanical interface is provided. In an embodiment shown, the keyboard 154 provides individual buttons or key structures that are separately actuatable to provide individual letters of the alphabet. The keyboard 154 may also include numbers or key that are operable in a numeric mode. Still further, various special characters may be provided or included on the keyboard. Other types of keypads (e.g. number pad) or keyboard configurations are also possible. For example, the keyboard 154 may include toggle-key structures, where individual key structures are actuatable into one of two or more states, and each actuated state has a separate character value.

FIG. 1B is a side view of the mobile computing device 100 in the extended position. According to an embodiment, the front and back housing segments 110, 150 are curved or contoured, and their motion relative to one another is not linear, but arced. In the extended position, an embodiment provides that the exterior front face 112 is tilted towards an angle of where the user is when holding the device in a normal operating position. In this position, the top end 111 of the front housing segment 110 is leaning forward. Likewise, the surface 152 of the back housing segment 150 may be contoured to be non-linear. In one embodiment, the surface 152 is tilted so that a region of the back housing segment on which the keyboard 154 is provided is tipped towards the user when the device is held in an upright position.

FIG. 1C is a frontal view of the mobile computing device 100 in a contracted or closed position, under an embodiment. In the contracted state, an overall length L of the device 100 is minimized. In one embodiment, the contracted position coincides with the back housing segment 150 (see FIG. 1A and FIG. 1B) being slid completely behind the front housing segment 110. In such an embodiment, none of the back housing segment 150 is viewable from the front view. However, in an alternative variation, the back housing segment 150 may include one or more sections that are viewable from the front when the device is contracted. For example, the back housing segment 150 may include a section that extends below the front housing segment 110 when the two segments are moved into the contracted state.

FIG. 1D is a side view of the mobile computing device 100 in the contracted or closed position. As shown in FIG. 1D, the mobile computing device 100 may collapse into the contracted position so to form a clamp shaped device.

FIG. 1E illustrates a path of motion of the housing segments moving from the extended position into the contracted position, under an embodiment. As shown by an arrow P, when sliding from the contacted position to the extended position, an embodiment provides that the movement of a given point on either of the housing segments 110, 150 may be arced or otherwise along a radius of curvature. The arched or curvature may be slight, but under such an embodiment, the sliding motion between the two positions is non-linear.

FIG. 1F is a rear view of the mobile computing device in the extended position, according to an embodiment. A back exterior face 122 of the front housing segment 110 may be exposed. In an embodiment shown, the exposed back exterior face 122 is smooth and featureless. In one embodiment, the surface is metallic, and possibly reflective to enable its use as a mirror. Unlike many conventional approaches, structural features (e.g. tracks, mechanical attachment mechanisms) used to couple two housing segments on a mobile device are confined, to enable the back exterior face to be exposed as a smooth surface. The manner in which the two housing segments 110, 150 may be slideably coupled to move in an arch between the extended and contracted positions is illustrated with one or more embodiments of FIG. 5A and FIG. 5B and FIG. 6A thru FIG. 6C.

Second Extended Position

While an embodiment such as shown and described with FIG. 1A thru FIG. 1F describe a mobile computing device having an extended and a contracted position, another embodiment optionally provides for the computing device 100 to be structured so as to provide a second alternative extended position. In such an embodiment, the device 100 may be moved between a first extended position (FIG. 1A and FIG. 1B) and a contracted position along an arc, such as described above, and also between the contracted position and a second alternative extended position.

FIG. 2A and FIG. 2B illustrate the mobile computing device 100 positioned in a second extended position. The mobile computing device 100 may be manipulated into the first extended position that corresponds to that shown with FIG. 1A and FIG. 1B. Likewise, the mobile computing device may include the contracted position that corresponds to that shown with FIG. 1C and FIG. 1D. As shown by an embodiment of FIG. 2A, from the contracted position, the device may be moved into the second extended position. In the second extended position, a surface section 160 of the back housing segment is exposed. The surface section 160 may be equipped with or provided hardware or other functionality, such as a connector (e.g. micro-SD card, or SD Card), a camera lens or component, buttons or other interface features, or a laser pointer.

With reference to FIG. 2B, the motion of the back housing segment 150 moving into the second extended position is shown by path of motion arrow P'. In one implementation, the path of motion of the front and back housing segments 110, 150 being moved from the contracted position to the second extended position may include the same curvature as the motion of the two segments being moved from the first extended position to the contracted position. Alternatively, the motion between the first extended position and the contracted position, and between the contracted position and the second extended position, may be different. For example, the motion between the first extended position and the contracted position may be along a first radius of curvature, while the motion between the contracted position and the second extended position may be linear, or alternatively, along a second radius of curvature.

Back Housing Segment

Figure 3B:
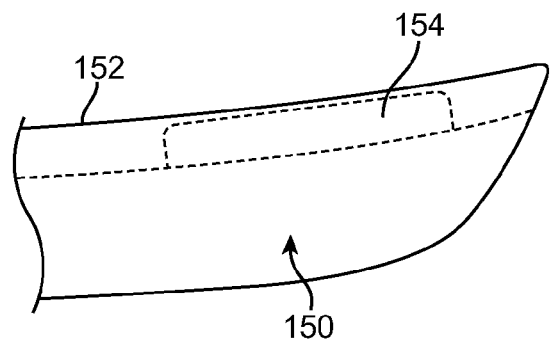
Figure 3C:
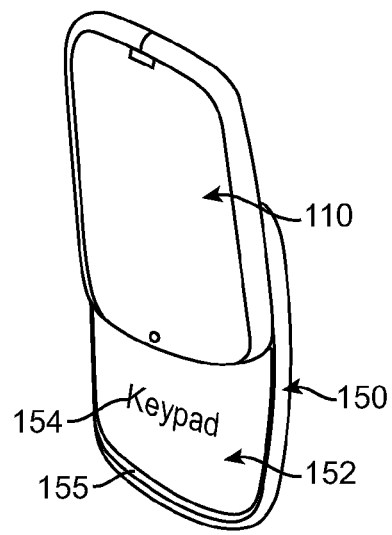

FIG. 3A thru FIG. 3C illustrate the back housing segment 150 of the housing when the housing segments are positioned in the extended position, according to an embodiment of the invention. As described in FIG. 1A and FIG. 1B, the exposable surface 152 may be accessible as the back housing segment 150 is moved into the extended position. The surface 152 of back housing segment 150 may include the keyboard 154 and/or other user-interface features. Example of such other user-interface features include, for example, application buttons, mechanical navigation interface (such as a 5-way or multi-way button or button set for navigation and selection), application buttons and/or other dedicated buttons or switches. By including most, if not all, of the mechanical user-interface features on the back housing segment 150, an embodiment such as shown enables the front housing segment 110 to be display-dominant and substantially seamless.

FIG. 3B is a close-up of a region A of FIG. 3A, under an embodiment of the invention. In an embodiment, the exposed surface 152 may be recessed or sunken on the back housing segment 150, at least with respect to a protruding edge that forms a lip 352. The lip 352 may circumvent the exposed surface 152. A depth as measured from the boundary defined by lip 352 and the surface 152 may be sufficient to accommodate a height (as extended vertically from the exposed surface 152) of the keyboard 154 or other interface feature. This allows the back housing segment 150 to slide behind the front housing segment 110 when the housing segments are moved into the contracted position.

FIG. 3C is an isometric front view of the device 100, showing the surface of the back housing segment, under an embodiment. The lip 352 circumvents the border of exposed surface 152 and includes an inner wall 355 that provides depth. Keypad 154 resides on the exposed surface 152, which as mentioned, is recessed. Other mechanical user-interface features that may be provided on the exposed surface 152 include button combinations that may be actuated to cause application functions or launch, call-answer/hang-up (in phone-device implementations), or scrolling and navigation operations. In the case of scrolling or navigation operations, a combination of buttons or mechanical actuators may be used to provide a multi-actuated-state interface that enables both directional and selection input. For example, a pad or combination of buttons may surround a center selection button to enable both directional or selection input to be entered.

As an alternative or addition, any of the mechanical actuation mechanisms described, such as the keypad 154, buttons and/or multi-way mechanism, may be provided through a sensor interface, such as a touch interface or light-sensitive interface that is used to detect hand movements and/or device orientation. The sensory interface may be provided in addition to any other sensory interface provided with the front housing segment 110.

Front Housing Segment

Figure 4A:
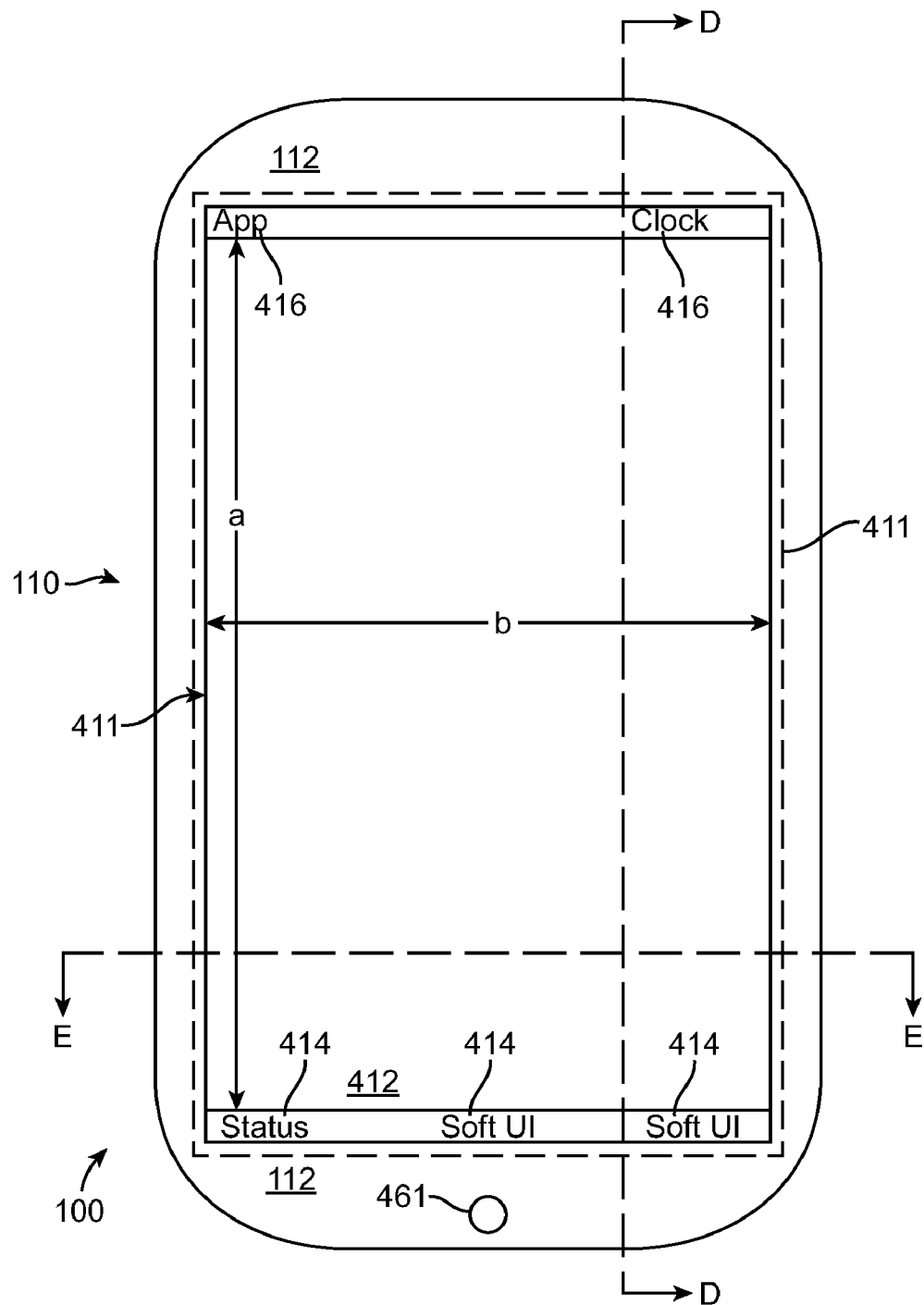
FIG. 4A-FIG. 4C illustrate a front housing segment of a computing device such as described with FIG. 1A-FIG. 1F, according to an embodiment of the invention.
Figure 4B:
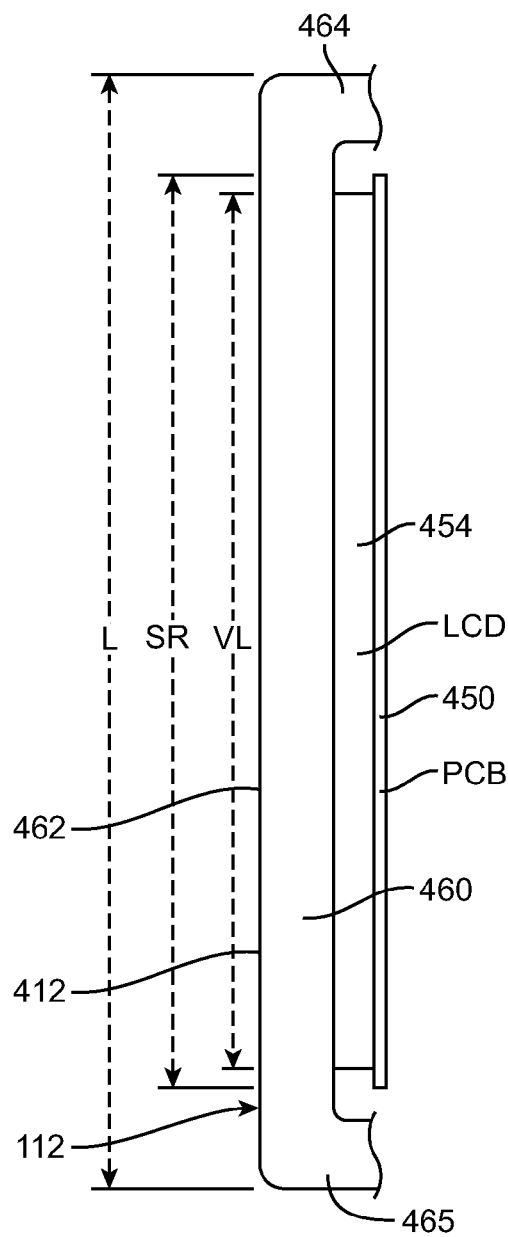
Figure 4C:
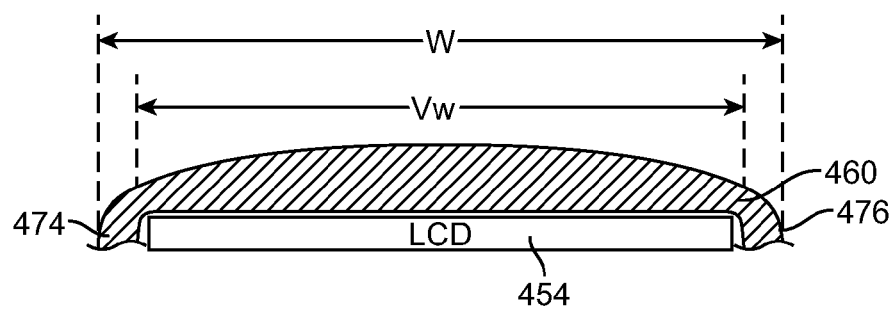

FIG. 4A-FIG. 4C illustrate the front housing segment 110 for computing device 100, according to one or more embodiment. As described, an embodiment provides that the front housing segment 110 is display-dominant. As display-dominant, most of the interface features and surface area is dedicated for use as a display surface or display interface (e.g. computer-generated soft buttons). Moreover, one or more embodiments provide that the front housing segment 110 includes various features that accentuate the segments appeal and functionality for display surface viewing and soft-user interface feature operability.

With reference to FIG. 4A, the front housing segment 110 of device 100 is shown to be dominant in display surface and optionally, soft user-interface features, such as touch areas and/or display surfaces. As the front housing segment 110 is dominant for such soft features, a substantial amount of the total area of the front face 112 is either a display surface 412 or a region on which various soft features 414, 416 and input areas are provided. The display surface 412 includes any surface that has computer-generated light patterns, as well as surfaces illuminated from light sources that are not computer-generated. For example, light sources (e.g. such as discrete light sources) may be used to illuminate specific regions of a translucent thickness in combination with touch-sensors, so as to create soft-buttons on the surface of the front housing segment 110.

In an embodiment, the area of the display surface 412 may be represented by dimensions a and b, which occupies a portion of the overall planarized area (i.e. without surface curvature) of the front surface of the housing segment 110, as represented by dimensions A and B. In an embodiment, the front face 112 is display-dominant so as to include soft user-interface features, with a substantial amount of the area being dedicated to providing a display surface 412 or its soft features. In one embodiment, a substantial majority of the area on the front face 112 (i.e. an area in excess of 60% of the total area of the front face 112) is dedicated to providing the display surface 412 and/or soft features (which may or may not be computer-generated).

Still further, one implementation provides for inclusion of isolated and small-profile mechanical features, including buttons or multi-way mechanisms. Features such as capacitive surfaces, light-sensitive surfaces, resistive sensors and touchpads may all be included on the front face 112. However, under one embodiment, the features may be incorporated or integrated into the display surface, and/or occupy a perimeter boundary in which the display surface 412 occupies the substantial majority of the front housing segment.

Still further, one implementation provides that the user-interface features 414 and/or 416 are provided as display surfaces that are separated or otherwise apart from the main display surface 412. For example, the user-interface features 414 may be provided as translucent thicknesses, with or without printed graphics, that overlay individual Light Emitting Diodes (LEDs) or other discrete light sources. The user-interface features 414 may be combined with capacitive sensors or light sensors to detect user-touch or interaction.

According to an embodiment, the display surface 412, including the soft features 414, 416, is flush with its surrounding area. As an addition or alternative, an embodiment provides that an extended area 411 (shown by phantom lines 411) that includes display surface 412 and soft features 414, 416 is seamless and contoured. The result is a substantially smooth and display-dominant front housing segment 110.

In an embodiment, the device 100 includes a mechanical interface 461 on the front exterior face 112. The mechanical interface 461 may correspond to a button or other push-mechanism. Selection actions or other functions may be performed in connection with, for example, soft features 414, 416 and/or independently.

FIG. 4B is a lengthwise side-cross sectional view of the front housing segment 110, as viewed along lines D-D, under an embodiment. The side cross-sectional view shows the display assembly 450 including a printed circuit board 452 and a liquid crystal display (LCD) 454, mounted underneath a clear/transparent or translucent shell 460. The clear or translucent shell 460 includes an exterior surface 462 that provides the front exterior face 112. Exterior surface 462 is shaped to be seamless and/or smooth. Additionally, the exterior surface 462 may also be contoured outward. The exterior surface 462 may wrap around inward towards a mid-section, with side sections 464, 466 extending inwards towards a back face (not shown) of the front housing segment. A chamber or space may be provided under the shell 460 and surrounded by the side section 464, 466. The LCD 454 may be provided within that chamber or space. Transition to the side sections 464, 466 may also be smooth, or uniformly formed with the remainder of the shell 460.

In an embodiment, a length VL of the display surface 412 (as provided by the LCD 454) extends a majority of an overall length L of the front exterior face 112. In one embodiment, the length VL is at least 60% of the overall length. A length that includes the display surface 412 and a sensory region SR, where, for example, touch from the user is detected, may overlap and/or extend beyond the length of the display surface.

FIG. 4C is a widthwise side-cross sectional view of the front housing segment, as viewed along lines E-E, under an embodiment. The shell 460 is shown to include a curvature when viewed widthwise on the cross-section. The curvature may be outward or convex. The shell 460 may be sufficiently small so that the bend or extra thickness that results from the contour of the shell 460 does not affect the user's view of the LCD 454 just under the shell 460.

In an embodiment, the shell 460 is formed from plastic that is shaped during a molding process. The molding process may yield the shell 460 with the curvature, side-sections 474, 476, and its seamless characteristics. In an embodiment, a width VW of the LCD 454 (or display surface 112) extends a substantial portion of the overall width W of the device.

Slider Assembly

One or more embodiments provide for a computing device that includes a slider assembly that is distributed between the front housing segment and the back housing segment. Such a slider assembly may enable, in combination with correspondingly shaped housing segments, a constant arced path of motion as one housing segment slides against another. Thus, a slider assembly such as shown and described, may be used to enable a continuous arced and smooth path of motion for one housing segment being moved against another, as the computing manipulated between the extended and contracted positions.

Figure 5A:
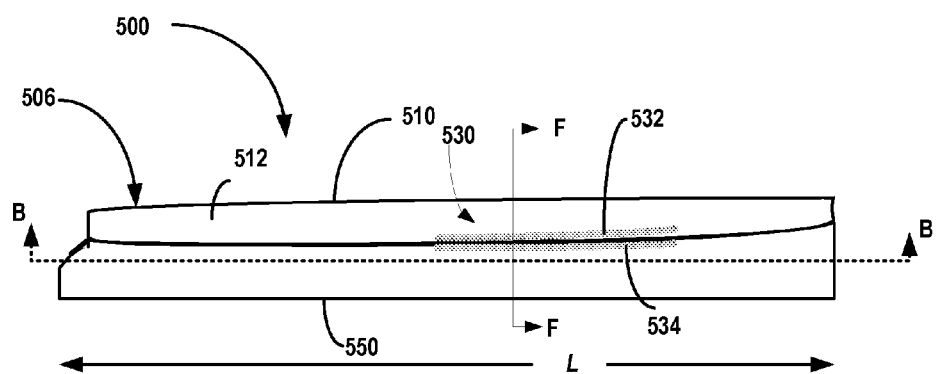
FIG. 5A and FIG. 5B illustrate a computing device equipped with a slider mechanism or assembly, in accordance with one or more embodiments of the invention.
Figure 5B:
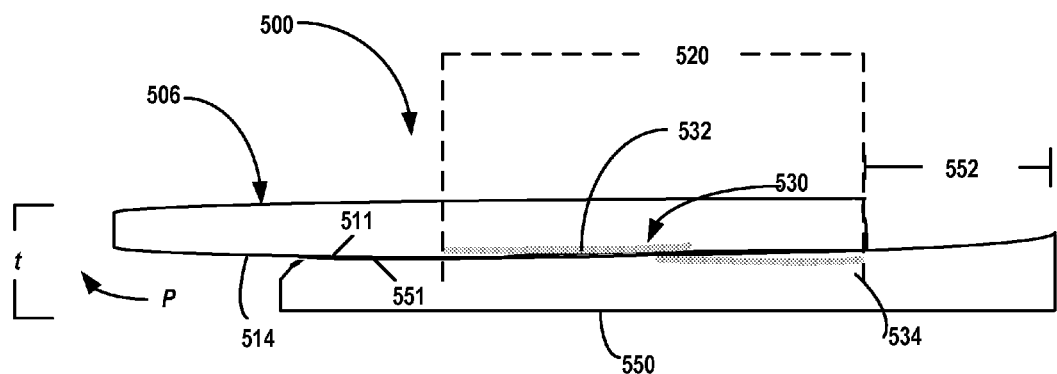

FIG. 5A and FIG. 5B illustrate a computing device 500 equipped with a slider mechanism or assembly, under an embodiment. In particular, a slider assembly such as shown and described with an embodiment of FIG. 5A and FIG. 5B enables a front and back housing segment of embodiments described herein to move between an extended and contracted position. The slider assembly may further enable the motion of two such housing segments to be continuously arced, so as to provide a constantly non-linear and smooth motion. The resulting arcuate path of motion differs from some conventional approaches that use strict linear motion, or a combination of linear motions, to enable the two housing segments to be moved between extended and contracted positions.

FIG. 5A is a side view of a mobile computing device that utilizes a slider assembly and includes housing segments that can be moved relative to one another from between an extended position and a contracted position, with the housing being shown in the contracted position, under an embodiment. An embodiment such as shown may be used to implement the sliding action between mobile computing devices for any of the embodiments described herein. With reference to FIG. 5A, a device 500 includes a housing assembly 506 that is formed from a front housing segment 510 and a back housing segment 550. The front and back housing segments 510, 550 are coupled to enable the segments to be moved relative to one another form the contracted position (as shown by FIG. 5A) into the extended position (FIG. 5B). By moving between extended and contracted positions, an overall length L of the device 500 may be maximized (extended position, shown in FIG. 5B) or minimized (contracted position, shown in FIG. 5A).

In an embodiment, an overall form factor of housing assembly 506 provides an outward contour on one or both of the housing segments. In one embodiment, the front housing segment 510 includes an exterior surface 512 that includes a display area (such as shown by FIG. 4A). The exterior surface 512 may be smooth and without transition or variation in thicknesses (e.g. beveless). As will be described, one embodiment provides that the front and back housing segments 510, 550 may be moved apart along a curved or otherwise non-linear path P. The path of motion P between the two housing segments 510, 550 is both non-linear and of a smooth curvature, rather than a combination of linear motions that enable two-dimensional motion. Specifically, the front housing segment 510 may be moved along a constant arc in order to place the device 500 in the extended position (as shown by FIG. 5B).

FIG. 5B is a side view of the mobile computing device of FIG. 5A, with the housing segments 510, 550 being positioned so that the device 500 is in the extended position. In an extended position, a region 552 of the back housing segment 550 is exposed. Thus, for example, a keypad or other component or functionality may be made selectively accessible on the exposed region 552. The keypad or feature may be accessible for use when the front and back housing segments 510, 550 are separated into the extended position. Likewise, in the extended position, a back panel 514 of the front housing segment 510 is exposed. The back panel 514 may be used to provide functionality. As an alternative, the back panel 514 may be used to provide a surface that is a mirror or otherwise featureless and smooth.

In order to enhance aesthetics and potentially maximize features that can be provided on respective surfaces of exposed region 552 and back panel 514, an embodiment provides for use of a slider assembly 530 that is shared amongst the front and the back housing segments 510, 550 and completely contained within a constantly overlapped section 520 of the housing assembly 506. The overlapped section 520 refers to a region of the interface between the front and back housing segments 510, 550 that are never exposed. The slider assembly may be positioned to operate in the interface region, which in an implementation shown, corresponds to a top boundary 551 of the back housing segment 550 and a back boundary 511 of the front housing segment 510. In an embodiment, the slider assembly 530 is not exposed on the interface region when the housing segments are in the extended position. By maintaining the slider assembly 530 completely within the overlapped section 520, the back panel 514 (when exposed), may for example, contain no visible structures that are required to enable the slider motion. For example, recesses, grooves, or sliding engagement structures may not be visible on the back panel 514, nor on any other surface that is exposable on the device 500.

Embodiments described herein provide for a slider assembly 530 that enables the front and back housing segments 510, 550 to be slid to and from the extended or contracted positions. The slider assembly 530 may be provided with low profile or thickness, to reduce an overall thickness dimension t of the device 500. In order to achieve such low profile, an embodiment provides that the slider assembly 530 is provided by structures that occupy an integrated layer 532, 534 with each of the front and back housing segments 510, 550. In particular, the integrated layers 532, 534 may occupy a surface or depth thickness on or within the respective housing segments. Each integrated layer 532, 534 may occupy a thickness that is within and/or at the boundary of the corresponding housing segment, where that housing segment overlaps with the other housing segment to slide or move in one direction or the other. While the structures being described may be at a boundary or interface of one housing segment with respect to another, the structures are not lateral perimeter features, such as would be provided by a telescoping slider construction.

In one embodiment, the integrated layer 532 of the front housing segment 510 includes a front structure that (i) includes a slot or other receiving feature for receiving a mechanical mating structure from the back structure that is integrated into the thickness of the back segment 550, and (ii) extends one or more structures into corresponding slots or other receiving features on the structure of the back segment 550. Likewise, the integrated layer 534 of the back housing segment 550 includes a back structure that (i) includes a slot or other receiving feature for receiving a mechanical mating structure from the front structure that is integrated into the thickness of the front housing segment 510, and (ii) extends one or more structures into corresponding receiver structures on the integrated layer 532 of the front segment 510. The features of the integrated layers 532. 534 for providing the couplings described may be provided in mid-sections that are apart from the perimeter or lateral edges of the housing segments. In particular, the slider assembly 530 may be provided as a distributed but integral part of a slide interface formed by the back boundary 511 of the front housing segment 510 and the front boundary 551 of back housing segment 550

The structures of each integrated layer 532, 534 may be provided at or adjacent to the boundary or surface of that housing segment. The structures may be a unitarily formed feature of the respective housing segments. Alternatively, the structures may correspond to a secured or connected element. In an embodiment such as described with FIG. 6A-FIG. 6C, for example, the structures may be provided by metal plates that secure into the housing segments and provide, or are positioned adjacent to the interface with the other housing segment.

According to an embodiment, the structures that are provided within the integrated layer 532, 534 of each of the front and back housing segments 510, 550 includes a combination of slots (see FIG. 6A-FIG. 6C) and securement features (see FIG. 6A-FIG. 6C), or other similar protrusions or structures which are received by the slots. The securement features are able to travel within boundaries defined by slots, in order to enable the front and back housing segments 510, 550 to be moved between the extended and contracted positions.

Slider Assembly

Figure 6A:
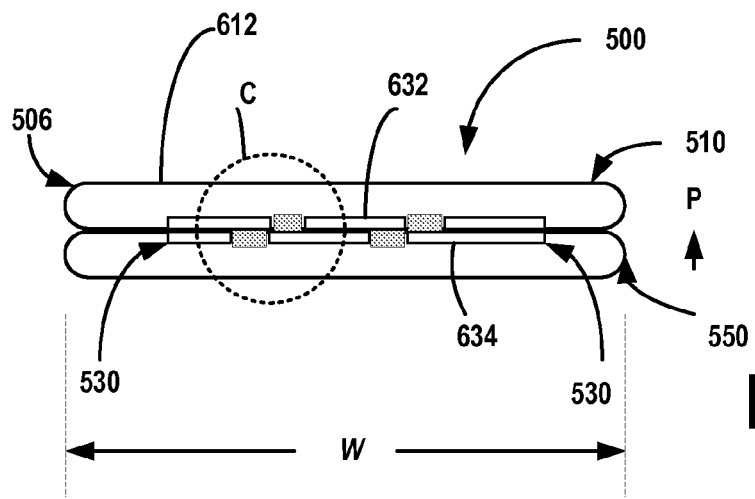
FIG. 6A is a side cross-sectional view of the mobile computing device shown with a slider assembly as viewed by a perspective of lines F-F in FIG. 5A, under an embodiment of the invention.

FIG. 6A is a side cross-sectional view of the mobile computing device 500 shown with a slider assembly as viewed by a perspective of lines F-F in FIG. 5A, under an embodiment of the invention. As shown, the front and back housing segments 510, 550 are maintained closely together, but the two segments are at least partially separable in the direction of the length of the device to enable a sliding motion. The close proximity of the front and back housing segments 510, 550 enables use of a slider assembly 530 such as described an embodiment of FIG. 5A and FIG. 5B, for purpose of enabling a smooth and rounded path of motion of one housing segment sliding against the other. In an embodiment, the slider assembly 530 includes features provided on the integrated layers 532, 534 of each segment that enable sliding motion amongst the two connected segments. As shown by the path of motion P, the sliding motion may be smooth and arced, or otherwise include a positive radius of curvature.

As housing segments, each of the front and back housing segments 510, 550 retain internal electrical components of the device 500. The components include, for example, processors, memory components, interconnect elements, a printed circuit board, internal elements of a keypad of keyboard, a Liquid Crystal Display (LCD) of a display assembly, speakers or other audio equipment, wireless transmitters for different types of wireless communication mediums (e.g. Wireless Fidelity or WiFi, Bluetooth, WiMax cellular) and numerous other components. In one embodiment, one of the top or back housing segments 510, 550 is primary, in that it includes most of the internal components. For example, under one implementation, the front housing segment 510 may retain the display assembly and the processors and memory, while the back housing segment 550 retains the keypad, and the battery for the device 500. Connectors or accessory interfaces may be provided on either housing segment. A flex cable or other interconnect mechanism may be used to electrically couple the components of one housing segment to the other. For example, the keypad and battery in the back housing segment 550 may be electrically interconnected to a PCB retained in the front housing segment 510 through a flex cable.

Figure 6B:
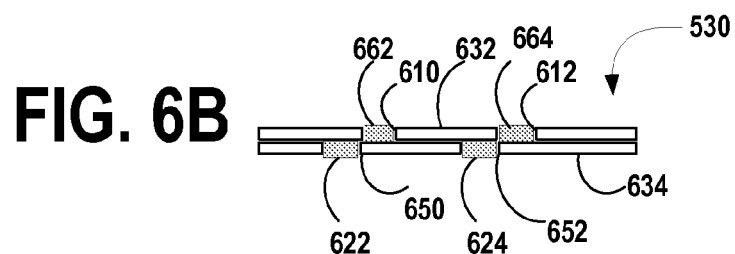
FIG. 6B illustrates the slider assembly of an embodiment of FIG. 6A, separated from the housing assembly, under an embodiment.

FIG. 6B illustrates the slider assembly 530 separated from the housing assembly 506 (FIG. 6A), under an embodiment. In an embodiment, the slider assembly 530 includes a front plate 632 and a back plate 634, each of which provide or form part of the respective integrated layer 532, 534 (FIG. 5A and FIG. 5B). The front plate 632 may be secured or otherwise integrated with the back surface 511 (FIG. 5B) of the front housing segment 510. Likewise, the back plate 634 may be secured or otherwise integrated with a top surface 551 (FIG. 5B) of the back housing segment 550.

In an embodiment, each plate 632, 634 includes duplicate sliding retention features to retain the two housing segments 510, 550 connected to one another. In one embodiment, the front plate 632 includes a pair of the slots 610, 612 which are formed in the plate to extend in a lengthwise or longitudinal direction of the device 500. Likewise, the back plate 634 includes slots 650, 652 which also extend in the longitudinal direction. Each slot 610, 612 of the front plate 632 may be used to receive a securement feature 662, 664 that is integrated or otherwise secured to the back plate 634. Each slot 650, 652 of the back plate 634 may be used to receive a securement feature 622, 624 that is integrated or otherwise secured to the front plate 632. The combination of the slot 610 of the front plate 632 and the securement feature 662 of the back plate 634 provide a first sliding coupling between the front and back housing segments 510, 550. In an embodiment shown, three additional sliding couplings may be formed by the combinations of (i) the slot 612 of the front plate 632 and the securement feature 664 of the back plate, (ii) the slot 650 of the back plate 634 and the securement feature 622 of the front plate 632, and (iii) the slot 652 of the back plate 634 and the securement feature 624 of the front plate 632.

Figure 6C:
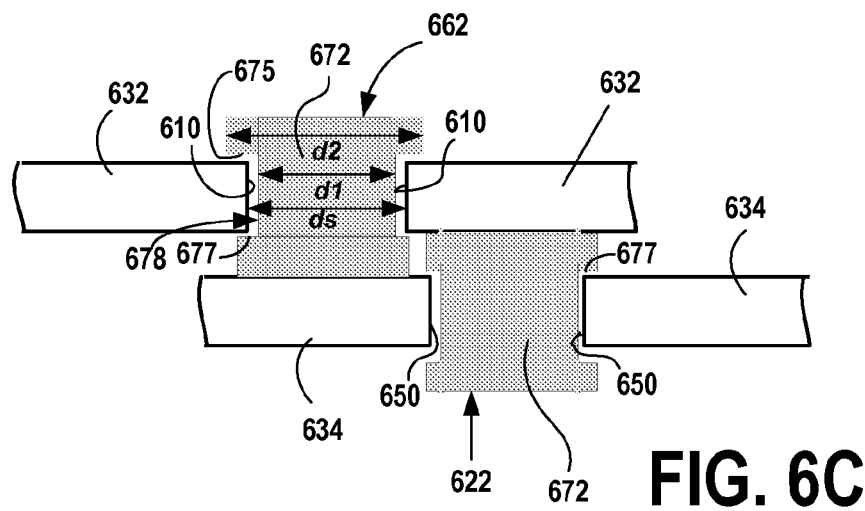
FIG. 6C is a close-up of the slider assembly of FIG. 6A, as indicated by region C of FIG. 6A, according to an embodiment.

In an embodiment shown by FIG. 6A-FIG. 6C, the positioning of the couplings along the width W (FIG. 6A) of the plates 632, 634 may be staggered. In another embodiment such as shown by FIG. 6A, the couplings may be overlaid on one another and/or aligned end-to-end, or a combination thereof. In one arrangement shown, the couplings that correspond to those formed with slots 650, 652 of the back housing segment 550 (FIG. 6A) are provided towards the perimeter of the cross-section shown, while the couplings that correspond to those formed with slots 610, 612 that are provided with the front housing segment 510 (FIG. 6A) are provided more towards the interior.

Among other benefits, the use of four such couplings enables a sliding engagement between the front and back housing segments 510, 550 which is durable and also a guard against overuse or mishandling by the user. Mishandling may occur when a user pulls on one housing segment axially (i.e. along axis Z), so as to pull the segments apart in a direction that is not consistent with the sliding motion. The potential for such misuse is heightened as a result of an embodiment in which the path P is continuously arced. The use of multiple couplings that are shared between the front and back housing segments 510, 550 (FIG. 6A) facilitates handling of forces that may arise from the pulling apart or other mishandling of the housing segments 510, 550 (FIG. 6A).

FIG. 6C is a close-up of the slider assembly of FIG. 6A, as indicated by region C of FIG. 6A, according to an embodiment. In the region shown, the securement feature 662 of the back plate 634 is engaged into the slot 610 of the front plate 632, and the securement feature 622 of the front plate 632 is secured into the slot 650 of the back plate 634. Each securement feature 622, 662 may be provided as a mechanical extension from the respective plate 632, 634. In one implementation, the securement features 622, 662 are cleats fastened to the respective plates. In another implementation, for example, the securement features 622, 664 are unitarily formed extensions or protrusions.

Each securement feature 622, 662 may include a body 672 that includes a retention feature. In one embodiment, the retention feature may be defined by top wall 675 and back wall 677 that define a vertical opening 678. The dimension of the vertical opening 678 is greater than a thickness of the plate 632, 634, so that the entire securement feature 622, 662 can slide in the corresponding slot 610, 650. In particular, a cross-dimension d1 of the body 672 at where the vertical opening 678 is formed on each side may be just smaller than the cross-dimension ds of the corresponding slot so as to enable the securement feature to be retained and moved within the slot. A cross-dimension d2 of the body 672 at where either the top wall 675 or back wall 677 are formed may be greater than the overall cross-dimension ds of the corresponding slot, so to enable retention of the coupling.

A detailed description of one or more slider mechanisms for use with any of the embodiments described herein is provided in U.S. patent application Ser. No. 11/954,200, entitled SLIDER ASSEMBLY FOR A HOUSING OF A MOBILE COMPUTING DEVICE, filed Dec. 11, 2007; and hereby incorporated by reference in its entirety for all purposes.

Figure 7:
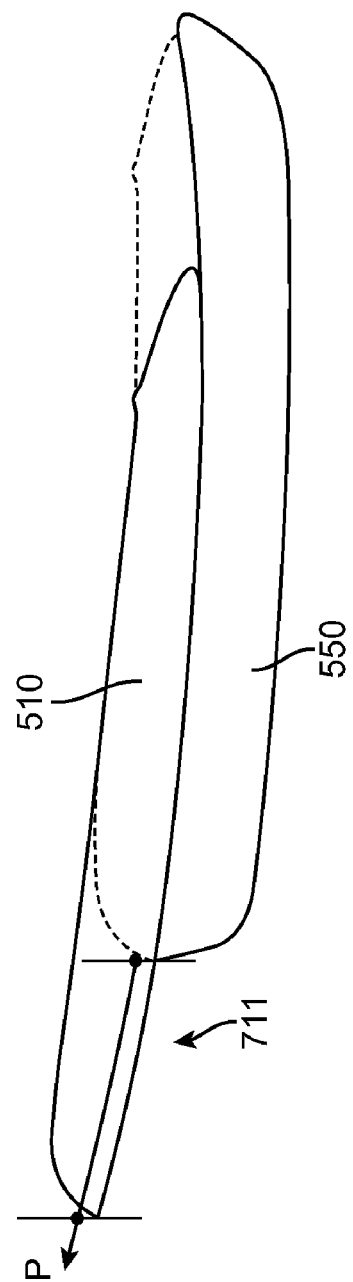
FIG. 7 illustrates housing segments that are moveable along a path of motion that is continuously arced or non-linear, under an embodiment of the invention.

FIG. 7 illustrates a movement of the front housing segment 510 against the back housing segment 550 along a path of motion that is continuously non-linear. In an embodiment, the path of motion P is shown by movement of a point 711 on the top housing segment 510, as the top housing segment moves against the bottom housing segment 550. The reverse scenario of the bottom housing segment being moved is also possible in an alternative implementation. As the back surface 511 of the front housing segment 510 and the front surface 551 of the back housing segment 550 are contoured (e.g. in clam shell design), the integrated slider assembly enables the sliding motion between the two housing segments to be a smooth and rounded path of motion P, for at least some points on the top housing segment 510. In one embodiment, the path of motion P is continuously arced, so that from start to finish, the motion is arced.

Hardware Diagram

Figure 8:
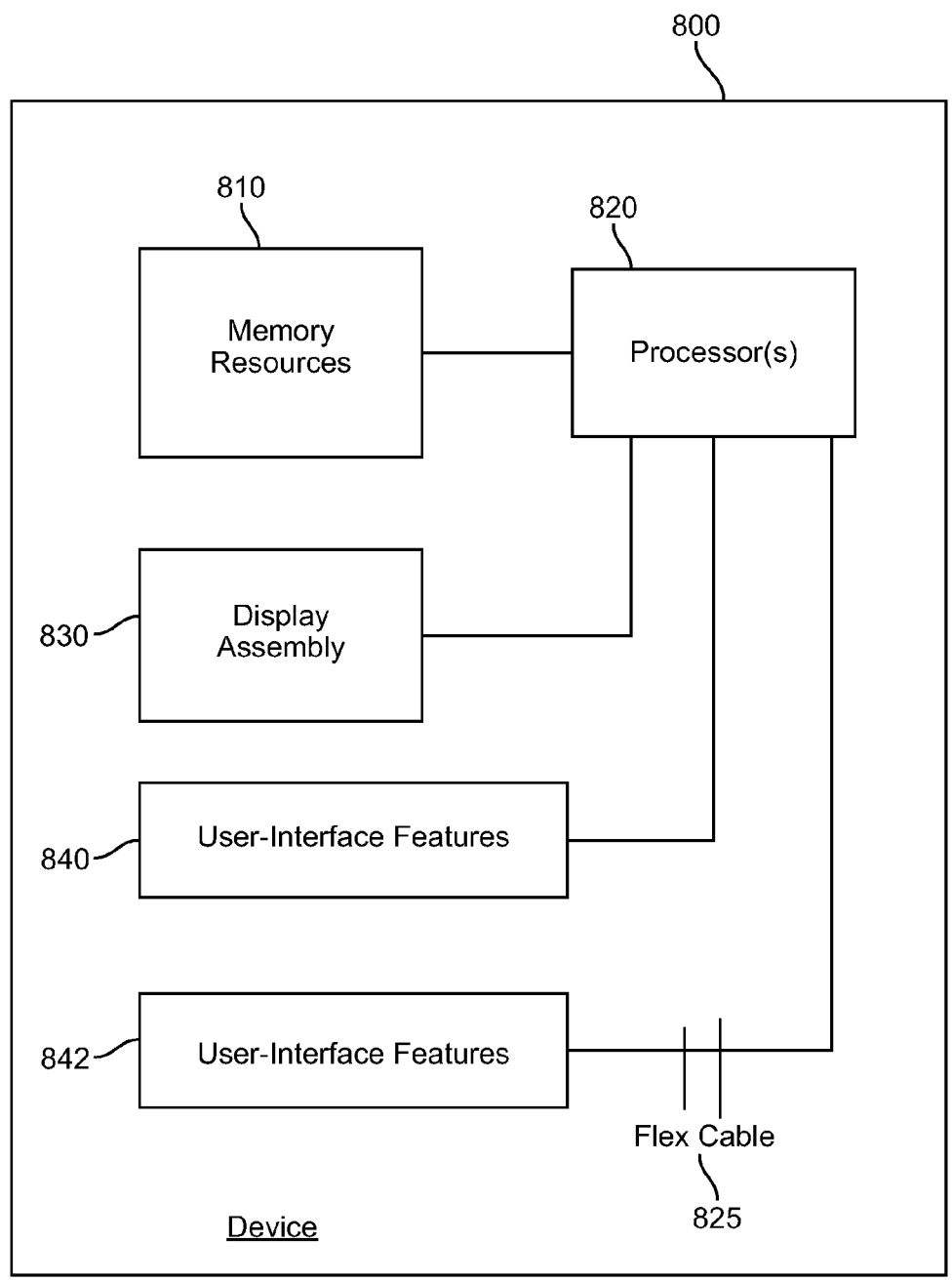
FIG. 8 is a hardware diagram of a device for use with any of the embodiments described herein.

FIG. 8 is a hardware diagram of a device for use with any of the embodiments described herein. A device 800 may correspond to any of the devices illustrated with preceding embodiments. The device 800 may include memory resources 810, one or more processors 820, a display assembly 830, and various user-interface features 840, 842. In one embodiment, at least some of the user-interface features 840, 842 (e.g. keyboard or keypad) may be separated so as to be in a different housing segment from the one or more processors 820. A flex cable 825 may be used to interconnect the separated input/output interfaces 842 from the processors 820 and/or other components. However, in other embodiments, any of the internal components and devices, including one of multiple processors, may be distributed between the two housing segments.

According to an embodiment, the display assembly 830 is provided its own housing segment. The one or more processors are capable of generating or detecting input from soft-interface features that are provided with the display assembly 830. The soft-user interface features may be provided as computer-generated features in connection with operation of the display assembly 830, or alternatively, as fixed features. As mentioned with prior embodiments and/or soft-user interface features may operate with touch, contact or light sensors (e.g. capacitive sensors).

Additional Functionality

Embodiments described herein may be configured to perform programmatic and automatic actions in response to detecting that the device is in either of the contracted or extended positions. For example, the processor(s) 820 of the device 800 may actuate on when in the extended position. With reference to an embodiment of FIG. 2A and FIG. 2B, the device may be triggered to perform additional programmatic functions when positioned in the second extended position. For example, the device may launch a camera application with exposure of a lens in the second extended position.

Alternatives

While embodiments described herein provide for the front housing segment to include display surfaces, capacitive input features, and a limited number of mechanical features, one or more embodiments may, as an addition or alternative to any of the embodiments described above, provide for a shell of the exterior front face to be moveable inward in order to enable the user to enter some forms of input. For example, the user may push the shell of the front exterior surface inward in order to enter selection input. U.S. patent application Ser. No. 11/849,133 filed Aug. 31, 2007, entitled SOFT USER-INTERFACE FEATURE PROVIDED IN COMBINATION WITH PRESSABLE DISPLAY SURFACE; is hereby incorporated by reference in its entirety. The aforementioned application describes the use of a display surface that is moveable inward or otherwise pressable to cause actuation of a corresponding switch element. According to an embodiment described herein, the front exterior face may be constructed as described in the '133 application to move inward and actuate any one or more switch elements. The display surface of the front exterior surface may be used to provide, for example, soft-buttons or other features on the front exterior surface. The combination of such features and the moveable or pressable front exterior face may enable the soft-features to be used or feel like mechanical buttons. The display surface may alter the buttons or replace the buttons with display content.

U.S. patent Ser. No. 11/840,916, filed Aug. 17, 2007, entitled SENSOR-KEYPAD COMBINATION FOR MOBILE COMPUTING DEVICES AND APPLICATIONS THEREOF, is also hereby incorporated by reference. The aforementioned '916 application provides various examples of housing surfaces that can be moved inward.

Furthermore, variations to any of the embodiments described herein provide for use of capacitive sensors that detects characteristics of the user-interaction that include more than determining the position of contact. U.S. patent application Ser. No. 11/379,552, filed Apr. 20, 2006, entitled KEYPAD AND SENSOR COMBINATION TO PROVIDE DETECTION REGION THAT OVERLAYS KEYS, describes the use of capacitive sensors that utilize motion, velocity and/or acceleration detection to interpret a contact or near-contact interaction by the user with the computing device. Likewise, with regard to any of the embodiments described herein, sensors may be used to interpret input from user interaction that includes contact or near-contact, as well as motion of finger movement (such as direction, gesture or path formed), and other characteristics of the interaction such as finger velocity and acceleration.

Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. Thus, the absence of describing combinations should not preclude the inventor from claiming rights to such combinations.

The invention claimed is:

1. A mobile computing device comprising:
   a front housing segment that includes a display surface on a front exterior face;
   a back housing segment that includes a keypad; and
   a slider assembly comprising a front plate coupled to the front housing segment and a back plate coupled to the back housing segment, the front plate including at least two front slots and at least two front securement features, and the back plate including at least two back slots and at least two back securement features, wherein the at least two front securement features are received and slideably engaged with the at least two back slots and the at least two back securement features are received and slideably engaged with the at least two front slots;
   wherein the slider assembly enables the front housing segment and the back housing segment to move between an extended position and a contracted position so that a path of motion followed by one of the front housing segment or back housing segment when moving between the extended position and the contracted position is continuously arced.

2. The mobile computing device of claim 1, wherein all of the front exterior face is smooth and seamless.

3. The mobile computing device of claim 1, wherein substantially all, but not an entirety of the front exterior face is smooth and seamless.

4. The mobile computing device of claim 3, wherein the front exterior face includes a set of one or more mechanical interface features provided on a designated region.

5. The mobile computing device of claim 3, wherein the front exterior face includes only a single interface feature that protrudes from the front exterior surface.

6. The mobile computing device of claim 1, wherein the display surface of the front housing segment occupies an area on the front exterior face that occupies at least a substantial portion of an overall area of the front exterior face.

7. The mobile computing device of claim 1, wherein the display surface of the front housing segment includes a length or a width that occupies at least a substantial portion of a corresponding overall width or length of the front exterior face.

8. The mobile computing device of claim 1, wherein the front exterior face includes a plurality of soft-user interface features that are provided apart from the display surface.

9. The mobile computing device of claim 8, wherein the display surface is rounded and convex on the first housing segment.

10. The mobile computing device of claim 1, wherein the display surface is smooth and seamlessly provided on the front exterior face.

11. The mobile computing device of claim 10, wherein the front exterior face is rounded and convex.

12. The mobile computing device of claim 10, wherein the front housing segment includes a touch-sensitive area that at least partially overlaps the display surface.

13. The mobile computing device of claim 12, wherein the touch-sensitive area encompasses all of the display surface.

14. The mobile computing device of claim 12, wherein the front housing segment houses a liquid crystal display (LCD) component that generates the display surface on the front exterior face.

15. The mobile computing device of claim 14,
   wherein the front housing segment includes a translucent shell that extends over the LCD component to provide the display surface, and wherein one or more touch sensors are provided with or in operational vicinity of the translucent shell to provide the touch-sensitive area.

16. The mobile computing device of claim 15, wherein the translucent shell is shaped to have a convex contour.

17. The mobile computing device of claim 1, wherein the keypad is provided on a surface of the back housing segment that is recessed or contoured inward and is exposed for use when the mobile computing device is in the extended position, and wherein a depth of the recessed or contoured surface accommodates a thickness of the keypad.

18. The mobile computing device of claim 17, wherein the keypad corresponds to a keyboard.

19. The mobile computing device of claim 1, wherein the front housing segment includes a backside, and wherein a portion of the backside is exposed when the front and back housing segments are moved towards the extended position, and where the portion of the backside that is exposed is smooth.

20. A mobile computing device comprising:
  a front housing segment that includes a display surface on a front exterior face;
  a back housing segment that includes a keypad; and
  a slider assembly comprising a front plate coupled to the front housing segment and a back plate coupled to the back housing segment, the front plate including at least one front slot and at least one front securement feature, and the back plate including at least one back slot and at least one back securement feature, wherein the at least one front securement feature is received and slideably engaged with the at least one back slot and the at least one back securement feature is received and slideably engaged with the at least one front slot, and wherein the slider assembly enables the front housing segment and the back housing segment to move between an extended position and a contracted position;
  wherein substantially all of the front exterior face is smooth and seamless.

21. The computing device of claim 20, wherein the display surface of the front housing segment occupies a majority of an overall area of a front exterior face of the front housing segment.

22. The computing device of claim 20, wherein the slider assembly enables the front housing segment and the back housing segment to move between the extended and contracted positions along a path of motion that is continuously arced.

23. A housing assembly for a computing device, the housing assembly comprising:
  a front housing segment for a display surface on a front exterior face;
  a back housing segment that is structured to provide a keypad; and
  a slider assembly comprising a front plate coupled to the front housing segment and a back plate coupled to the back housing segment, the front plate including at least one front slot and at least one front securement feature, and the back plate including at least one back slot and at least one back securement feature, wherein the at least one front securement feature is received and slideably engaged with the at least one back slot and the at least one back securement feature is received and slideably engaged with the at least one front slot;
  wherein the slider assembly enables the front housing segment and the back housing segment to move between an extended position and a contracted position so that a path of motion followed by one of the front housing segment or back housing segment when moving between the extended position and the contracted position is continuously arced.

\* \* \* \* \*